US008046733B2

(12) United States Patent
Weber

(10) Patent No.: US 8,046,733 B2
(45) Date of Patent: Oct. 25, 2011

(54) METHOD AND SYSTEM FOR PROCESS COMPOSITION

(75) Inventor: Ingo Weber, Mannheim (DE)

(73) Assignee: SAP AG, Walldorf (DE)

( * ) Notice: Subject to any disclaimer, the term of this patent is extended or adjusted under 35 U.S.C. 154(b) by 1257 days.

(21) Appl. No.: 11/725,036

(22) Filed: Mar. 16, 2007

(65) Prior Publication Data

US 2008/0229275 A1    Sep. 18, 2008

(51) Int. Cl.
*G06F 9/44* (2006.01)
(52) U.S. Cl. ........................................................ 717/104
(58) Field of Classification Search ........... 717/104–109
See application file for complete search history.

(56) References Cited

U.S. PATENT DOCUMENTS

| | | | | |
|---|---|---|---|---|
| 6,370,681 | B1 * | 4/2002 | Dellarocas et al. | 717/110 |
| 7,120,896 | B2 * | 10/2006 | Budhiraja et al. | 717/105 |
| 7,793,154 | B2 * | 9/2010 | Chagoly et al. | 714/38 |
| 2007/0005618 | A1 * | 1/2007 | Ivanov et al. | 707/100 |
| 2007/0038490 | A1 * | 2/2007 | Joodi | 705/7 |
| 2008/0028365 | A1 * | 1/2008 | Erl | 717/105 |
| 2008/0195441 | A1 * | 8/2008 | Hacigumus | 705/7 |

OTHER PUBLICATIONS

Agarwal, Vikas, "A service creation environment based on end to end composition of Web services", *Proceedings of the 14th international conference on World Wide Web*, (2005), 128-137.
Berardi, Daniela, "Automatic Composition of Transition based Semantic Web Services with Messaging", *Automatic Composition of Transition based Semantic Web Services with Messaging*, SESSION: Research session: correctness and performance, (2005), 613-624.
Casati, Fabio, et al., "Adaptive and Dynamic Service Composition in eFlow", *Lecture Notes in Computer Science*; vol. 1789 *archive Proceedings of the 12th International Conference on Advanced Information Systems Engineering table of contents*, (2000), 13-31.
Dustdar, Schahram, "A survey on web services composition", *International Journal of Web and Grid Services*, 1(1), (2005), 1-30.
McIlraith, Sheila, et al., "Adapting Golog for Composition of Semantic Web Services", Knowledge Systems Laboratory Department of Computer Science Stanford University Stanford, (2002), 12 pgs.
Medjahed, Brahim, et al., "Composing Web services on the Semantic Web", *The VLDB Journal Â? The International Journal on Very Large Data Bases archive* vol. 12, Issue 4, (2003), 333-351.
Peer, Joachim, "A POP-based Replanning Agent for Automatic Web Service Compostion", In: *Presented at the Second European Semantic Web Conference ESWC 2005* in Crete, Greece, May 2005, 16 pgs.
Peer, Joachim, "Web Service Composition as AI Planning? a Survey", *Technical report*, Univ. of St. Gallen, Switzerland, (Mar. 22, 2005), 1-63.

(Continued)

*Primary Examiner* — Anna Deng
(74) *Attorney, Agent, or Firm* — Schwegman, Lundberg & Woessner P.A.

(57) ABSTRACT

A method and system for model composition. A business process model defined by a plurality of tasks may be accessed. A plurality of available executable elements capable of implementing the plurality of tasks may be identified. Each of the plurality of available executable elements may be capable of providing functionality to implement parts of the business process model. One or more executable elements may be selected among the plurality of available executable elements for each of the plurality of tasks. The selection may be based on functionality of an available executable element. The selected elements may be combined for the plurality of tasks to create an executable process for the business process model.

28 Claims, 9 Drawing Sheets

OTHER PUBLICATIONS

Rao, Jinghai, "A mixed initiative semantic web framework for process composition", *Proceedings of the IEEE International Conference on Web Services*, (2006),401-410.

Rao, Jinghai, "Semantic web service composition via logic based program synthesis", *Synthesis Department of Computer and Information Science, Norwegian University of Science and Technology*, (also Carnegie Melon School of Computer Science: www-2.cs.cmu.edu),(2004),166 pgs.

Schaffner, Jan et al., "A semi-automated orchestration tool for service-based business processes", *In: Proceedings of the 2nd International Workshop on Engineering Service-Oriented Applications: Design and Composition*, Chicago, USA, (2006),12 pgs.

Sirin, Evren, et al., "HTN Planning for Web Service Composition Using Shop2", *Journal of Web Semantics*, vol. 1, No. 4., (2004),377-396.

Sirin, Evren, et al., "Semi-automatic Comostion of Web Services using Semantic Descriptions", *Unversity of Maryland, Computer Science Department, University of Maryland, MIND Lab*, (2002),9 pgs.

Traverso, P, et al., "Automated Composition of Semantic Web Services into Executable Processes", *Technical Report, ITC-IRST Instituto Trentino di Cultura*, Technical report No. T04 06 08, Trento, Italy, (Jun. 2004),15 pgs.

* cited by examiner

METHOD AND SYSTEM FOR PROCESS COMPOSITION

FIELD

This application relates to process composition, and more specifically to systems and methods for model composition of a business process using executable elements.

BACKGROUND

Business Process Modeling (BPM) serves as an abstraction of the way enterprises do business, whereby threads of work are recorded as human comprehensible business process models. When modeling a business process, a modeler usually creates the process manually in a graphical tool. Three common approaches are: creating the business process model from scratch, starting from a reference model, or improving or creating a variant of an existing process model. The outcome is a business process model that reflects a business expert's view.

The business process model may then be implemented by IT experts. For example, the IT experts may map control and data flow of the process model to implement the business process model in an information system. The relationship between the business-level model and its IT-level implementation is oftentimes weak. Consequently, the resulting executable process implementation can deviate substantially from the business process model, and changes on one of the levels may not be easily propagated to the respective other level.

The business process model may change frequently due to internal business requirements such as integration of suppliers and customers, an implementation of new standards, deployment of new application components, and the like or external requirements (e.g., new regulations). The implementation of the changes may involve a significant effort by the IT experts, which may increase the cost of the implementation of the business process model and delay the use of an executable process that is both current and operable.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for process composition are described. In the following description, for purposes of explanation, numerous specific details are set forth in order to provide a thorough understanding of example embodiments. It will be evident, however, to one skilled in the art that the present invention may be practiced without these specific details.

An executable process may be created from a business process model by combining selected executable elements associated with a plurality of tasks. The business process model may be further refined by modifying the plurality of tasks, and a new set of selected executable elements may be combined to create a new executable process for the refined business process model.

The creation or refinement of the executable process from the business process model through process composition may provide a stronger link between creation of a business process model and an executable representation of the business process model. The manual effort ordinarily associated with creating the executable representation of the business process model may be reduced or eliminated through a higher degree of automation. The reduction or elimination may lower the cost associated with IT consulting for implementing the business process model.

The use of process composition may provide enterprise application integration and increase interoperability by, for example, providing design-time composition. Process composition may also simplify change management between the executable process and the business process model through dynamic combination of existing services to implement a process model.

Figure 1:
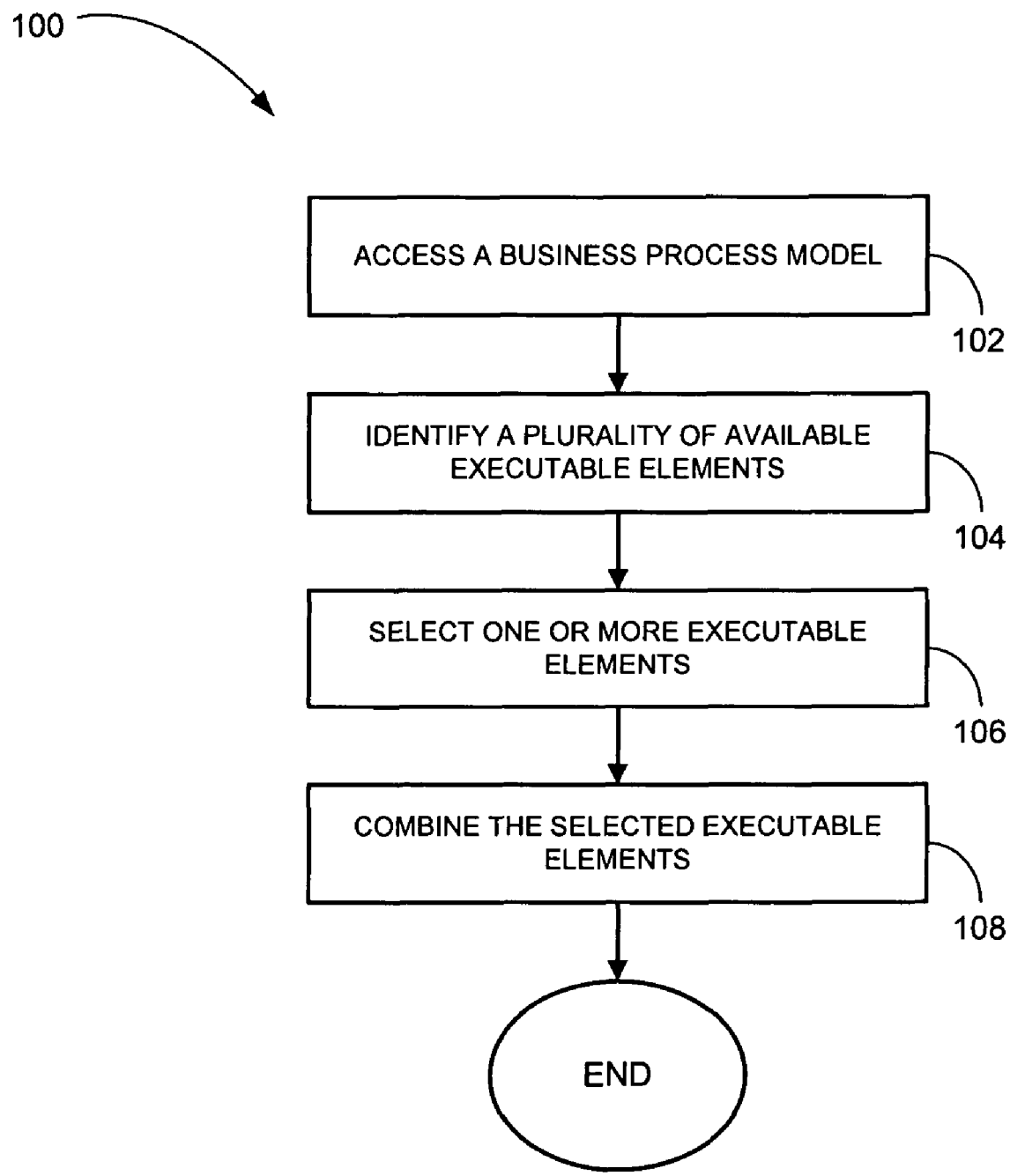
FIG. 1 is a flowchart illustrating a method for process composition in accordance with an example embodiment.

FIG. 1 illustrates a method 100 for process composition according to an example embodiment.

A business process model defined by a plurality of tasks may be accessed at block 102. The business process model may be conceptually modeled by depicting the business process model on a high modeling level. The business process model may be expressed in a graphical diagram and/or in a notation including Business Process Modeling Notation (BPMN), Event-driven Process Chains (EPC), Uniform Modeling Language (UML) Activity Diagrams, and the like.

The business process model may optionally take into account transactional requirements. By way of example, the business process may involve booking a hotel and a flight, but if one of the bookings fails, the process does not make the other booking. The business process model may also serve as a detailed goal description including a refinement of the goal. A scope over which transactional behavior is specified may also be expressed in the business process model.

The plurality of tasks may be associated with the business process model according to an implicit (e.g., a rules based approach) or explicit control flow. The data flow for the business process model may also be implicit or explicit. For example, data may be made available during the business process when needed by a particular task according to control flow.

A task, which may also be referred to as a function or an activity, may be capable of implementation by a single service or through orchestrating multiple services. Multiple tasks may also be implemented with a single service (e.g., when the granularity of the tasks is smaller than that of the service).

A task may optionally be defined (e.g., in a formal representation) in terms of preconditions and an anticipated goal.

Each of the plurality of tasks may be associated with at least one resource that is capable of performing the task, and a set of tasks may share a resource assignment. The resource may include one or more persons and/or one or more devices that may be involved in implementing the task. For example, the executable process may be ultimately run on one or more devices as operated by one or more persons.

Preconditions and/or goals may optionally be given for a task by use of a semantic mark-up language. The preconditions and/or goals may also be refined by inference from the business process model and environmental context of the business process.

A plurality of available executable elements capable of implementing the plurality of tasks may be identified at block 104. For example, an identification of zero, one, several, or a large number of executable elements may be identified for implementing each task of the plurality of tasks.

Each of the plurality of available executable elements may be capable of providing functionality (e.g. through a service) to implement a part of the business process model. For example, an available executable element include functionality for a single task, multiple tasks, and/or a portion of one or more tasks, as well as functionality unrelated to the business process model. The available executable elements may, by way of example, be discoverable for identification from an executable element repository.

The available plurality of existing executable elements may optionally be annotated with a semantic description. The semantic description describes functionality and/or a non-functional property of an available executable element and may be used to determine applicability of an executable element for composition. The semantic description may be used to increase the quality and accuracy of composition, and may allow for easier and faster business process composition. The annotation of the semantic description may improve accuracy and speed a run-time selection of executable elements. The semantic description may also enable detection of missing services and be used to identify executable elements that provide related functionality.

The non-functional property may include a price incurred for running an available executable element, a non-currency cost (e.g., man or machine hours) associated with running the available executable element, a duration that the available executable element is to run, security associated with running the available executable element, or a quality of service associated with running the available executable element. Other non-functional properties may also be used.

The semantic description may optionally be formal and/or machine accessible and may have any of a number of formats including, but not limited to Web Ontology Language (OWL), Web Service Modeling Ontology (WSMO), Description Logics, First-order Logics, FrameLogics=F-Logics, Planning Domain Definition Language (PDDL), and Stanford Research Institute Problem Solver (STRIPS).

One or more executable elements may be selected among the plurality of available executable elements for each of the plurality of tasks at block 106. The selection may be based on functionality of an available executable element. The selection may also optionally be based on compatibility among the one or more selected elements for each of the plurality of tasks based on the at least one non-functional property. For example, the use of multiple executable elements to implement a task may cause functionality to be executed unrelated to the goal for which a further consistency check may be desired. The basis of a selection of the executable elements from among the plurality of available executable elements may include compatibility when, for example, constraints of the executable elements are overlapping. An example embodiment of selecting a plurality of executable elements for a task is described in greater detail below.

The selected elements for the plurality of tasks may be combined to create an executable process for the business process model at block 108. The executable process may be in Business Process Execution Language (BPEL), but other languages may also be used.

Figure 2:
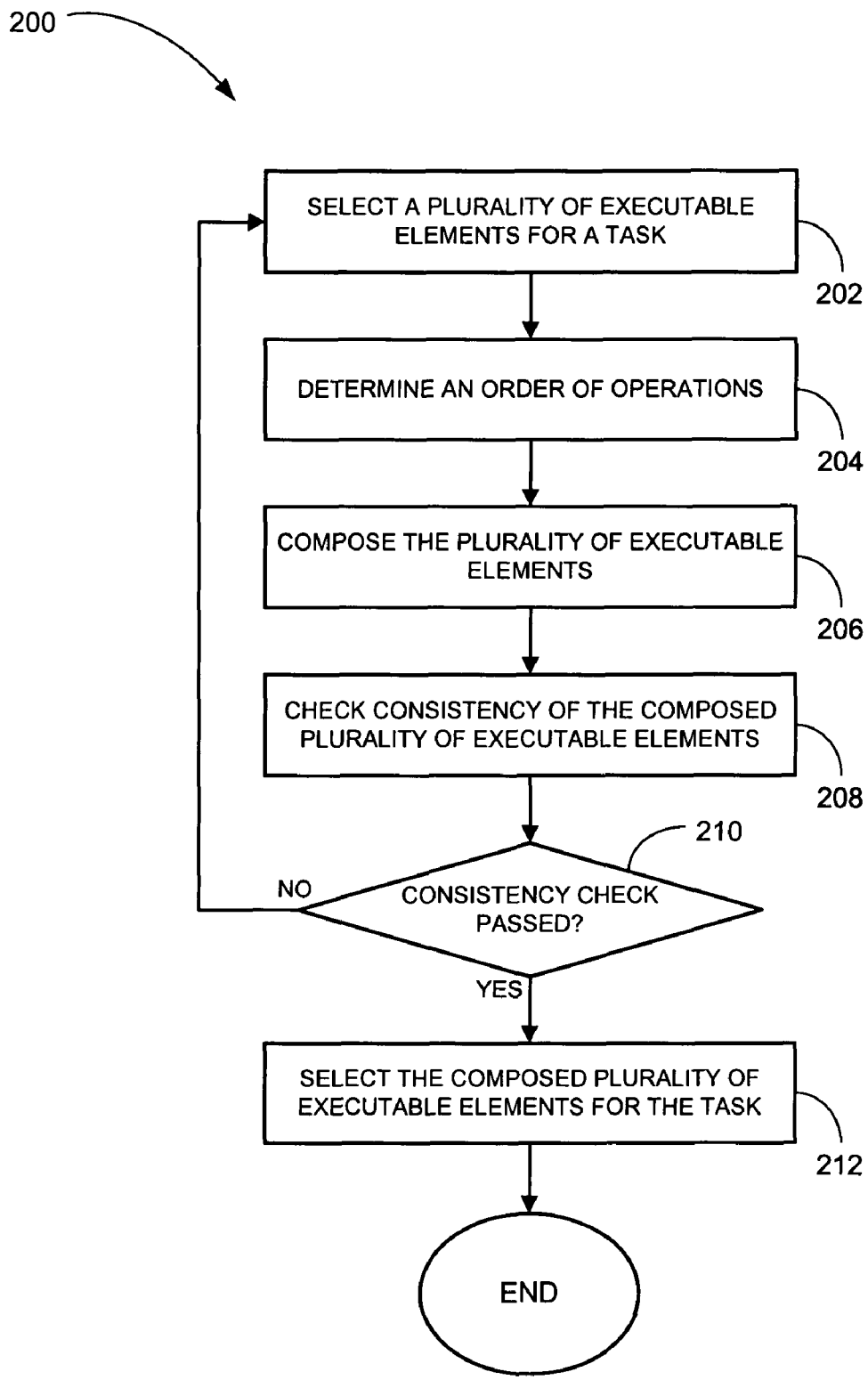
FIG. 2 is a flowchart illustrating a method for selecting a plurality of executable elements for a task in accordance with an example embodiment.

FIG. 2 illustrates a method 200 for selecting a plurality of executable elements for a task according to an example embodiment. In an example embodiment, the method 200 may be performed for one or more of the tasks at block 106 (see FIG. 1). The method 200 may compose a plurality of executable elements to effectively create a composite executable element capable of providing desired functionality for a particular task. For example, the method 200 may be performed for a task during the operations at block 106 when a single executable element does not include a desired functionality for a particular business process model.

A plurality of executable elements may be selected from among the plurality of available executable elements for a task of the plurality of tasks at block 202.

An order of operations may optionally be determined for the plurality of executable elements based on the functionality of the executable elements at block 204. At least one non-functional property of each of the plurality of executable elements may optionally be used in determining an order in a ranking of multiple compositions. For example, if there are multiple possible compositions, the at least one non-functionality property of the executable elements may be used for ranking the compositions.

The plurality of executable elements may be composed for the task at block 206. The plurality of executable elements may be composed from the perspective of an outcome of the task. The composing of the plurality of executable elements may optionally take into account the resources attached to the plurality of executable elements.

In an example embodiment, such as when the method 200 includes the optional operations at block 204, the plurality of executable elements may be composed according to the order of operations for the task at block 206. The order of operations may include operations that occur sequential and/or parallel.

The consistency of the composed plurality of executable elements according may optionally be checked according to a consistency check at block 208. The consistency check may verify that the composed plurality of executable elements does not violate constraints on usage or scope (e.g. order of operations), the functionality of an executable element service call does not undo a previous achievement of another executable element, and the like. For example, when a customer complains about an invoice, and the respective department did not yet answer the customer, the customer should not receive a dunning letter before processing of the complaint.

A determination may be made at decision block 210 as to whether the composed plurality of executable passed the consistency check. If the composed plurality of executable did not pass the consistency check, the method 200 may return to block 202. If a determination is made that the composed plurality of executable passed the consistency check at decision block 210, the method 200 may proceed to block 212.

The composed plurality of executable elements may be selected for the task at block 212. The composed plurality of executable elements may optionally be selected for the task when the composed plurality of executable element passes the consistency check at block 212.

In an example embodiment, an order in which a plurality of executed elements is selected for a task may be in accordance with preferences developed through process mining. Processing mining may be used with the method 200 to provide feedback on how often executable elements were selected, which tasks were cancelled, and where deviations from the executable elements might be desirable.

Figure 3:
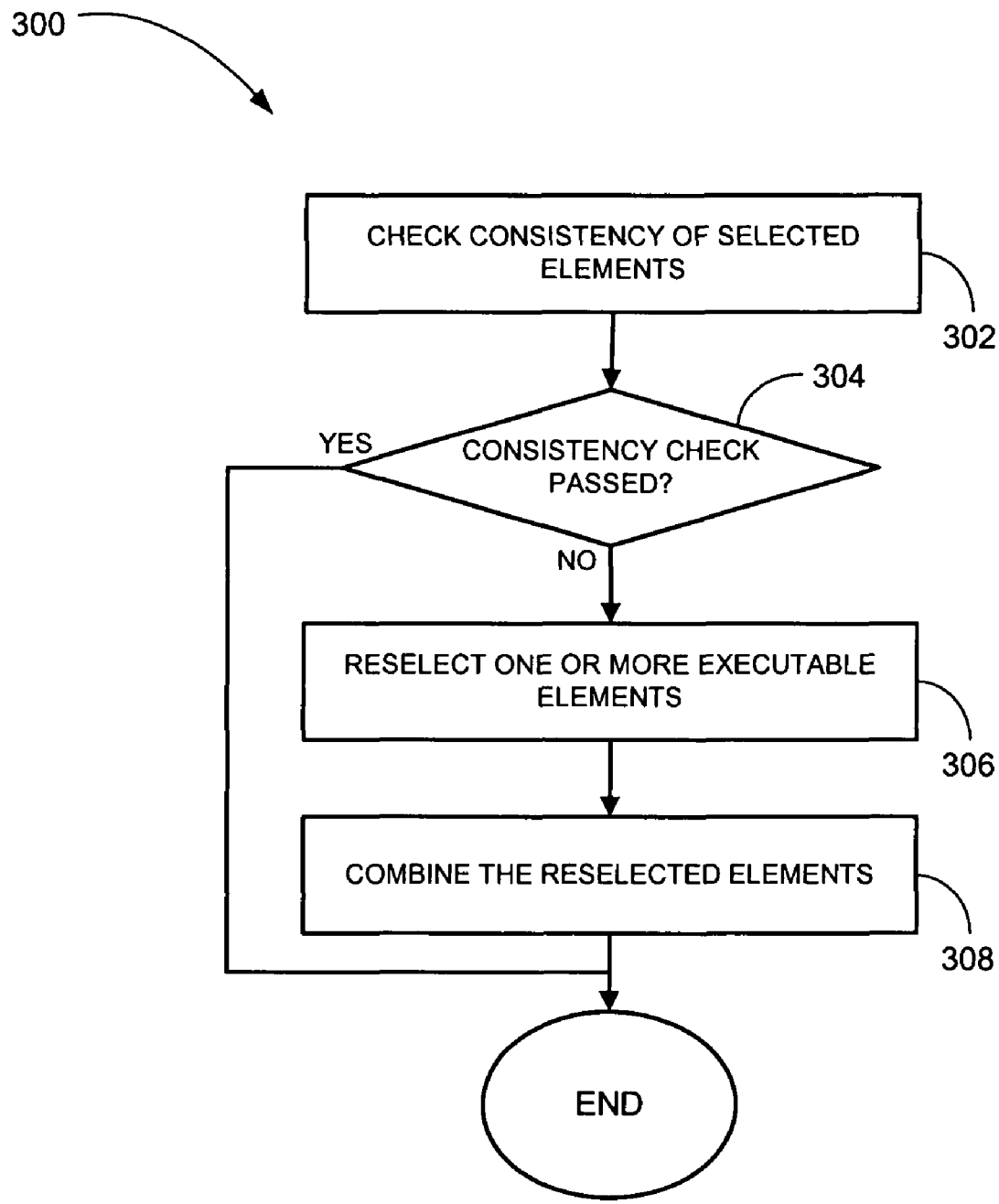
FIG. 3 is a flowchart illustrating a method for checking the consistency of an executable process in accordance with an example embodiment.

FIG. 3 illustrates a method 300 for checking the consistency of an executable process according to an example embodiment. In an example embodiment, the method 300 may be performed upon completing the method 100 (see FIG. 1) to ensure that the executable process implementation of the business process model is consistent for the plurality of tasks.

The consistency of the selected elements may be checked for the plurality of tasks at block 302. For example, the consistency of the one or more executable elements selected for a first task of the plurality of tasks may be checked for consistency a remainder of the tasks of the plurality of tasks.

A determination may be made at decision block 304 as to whether the selected elements passed the consistency check. If a determination is made that the selected elements passed the consistency check, the method 300 may terminate. If a determination is made that the selected elements of the executable process did not pass the consistency check at decision block 304, the method 300 may proceed to block 306.

One or more executable elements among the plurality of available executable elements may be reselected for at least one task of the plurality of tasks in response to feedback received from the consistency check at block 306. The reselection may be based on functionality of the available executable element and the feedback received from the consistency check. The reselected elements may include at least one different executable element than the selected elements.

The reselected elements may be combined for the plurality of tasks to create a revised executable process for the business process model at block 308.

In an example embodiment, instead of or prior to reselection during the operations at block 306 and block 308, the method 300 may attempt to resolve a consistency check that did not pass by attacking and resolving the problem directly. For example, an order of operations constraint may be applied to resolve an issue raised by the consistency check. By way of an example, when the current composed executable process A and B are to be executed in parallel, but according to their description they should not be, prior to trying to replacing A or B with C, an ordering of A and B (e.g., through an ordering constraint) may be tried to determine whether its application resolves the problem that caused the consistency check to fail.

Figure 4:
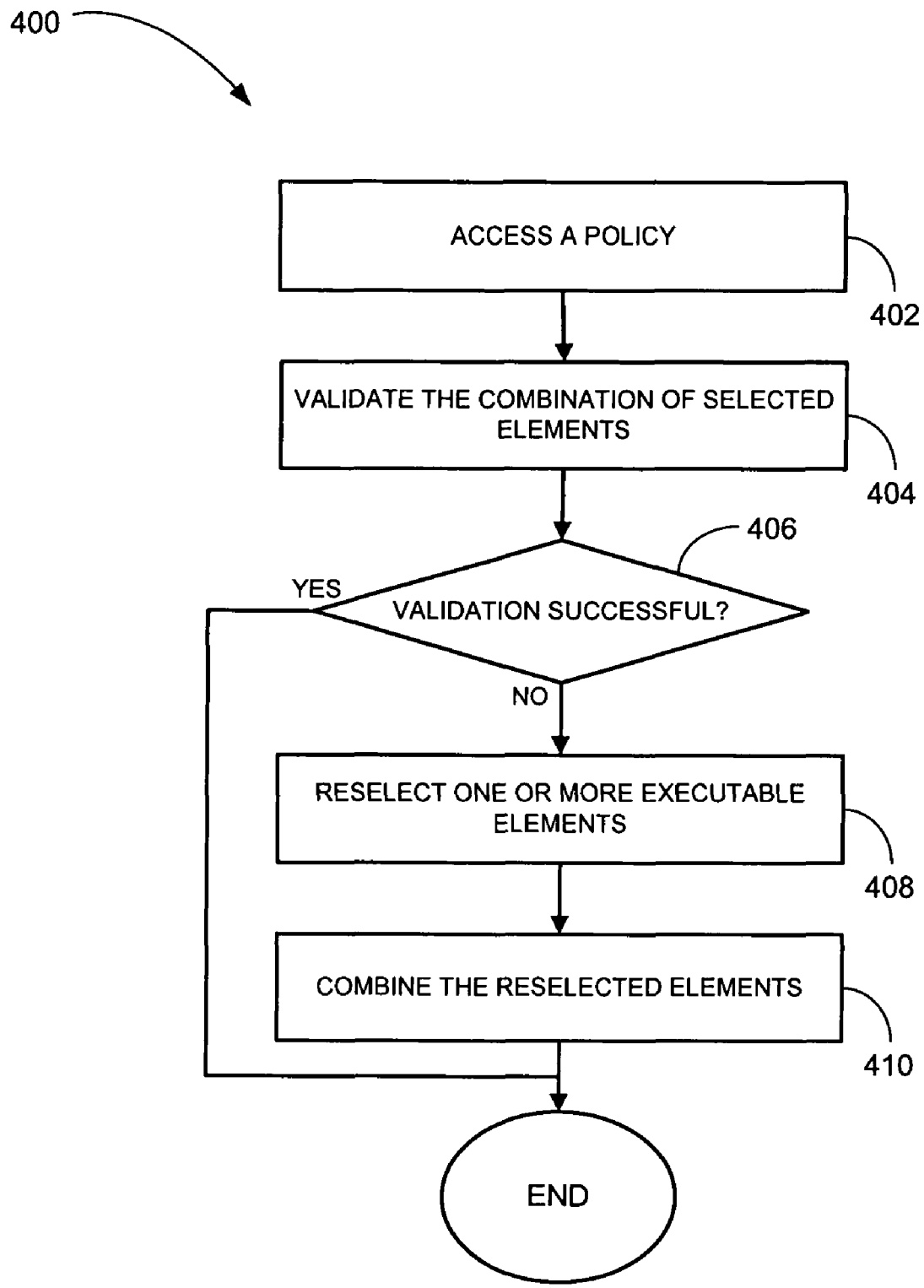
FIG. 4 is a flowchart illustrating a method for validating an executable process in accordance with an example embodiment.

FIG. 4 illustrates a method 400 for validating an executable process according to an example embodiment. In an example embodiment, the method 400 may be performed after completing the method 100 (see FIG. 1) to ensure that the executable process implementation of the business process model is in accordance with at least one policy.

A policy may be accessed at block 402. The policy may be an internal policy or an external policy used for validation of a business process model by a business. For example, the external policy may be a regulation such as Basel II or Sarbanes Oxley (SOX). The policy may be expressed in a machine-accessible way.

By way of example, the policy may include a joint outcome policy and/or a case-based cancellation policy. The case-based cancellation policy may take into account transactional requirements, in that a certain set of executable elements might include an interrelationship with respect to a joint outcome. For example, the joint outcome may be that either all executable elements achieve a positive outcome or the effects of all executable elements executions may be undone. Other policies may also be used.

The combination of selected elements for the plurality of tasks may be validated for compliance with at least one policy at block 404. The validation may be performed during the operations at block 404, or by providing the executable process to a validator and receiving an evaluation of the combination of selected elements for the plurality of tasks for compliance with at least one policy from the validator. For example, the validation may be performed sequentially based on a prioritization.

A determination may be made at decision block 406 as to whether the validation was successful. If a determination is made that the validation was successful, the method 400 may terminate. If a determination is made that the validation was not successful at decision block 406, the method 400 may proceed to block 408.

One or more executable elements among the plurality of available executable elements may be reselected for at least one task of the plurality of tasks in response to feedback received from the validation at block 408. The reselection may be based on functionality of the available executable element and the feedback received from the validation, the reselected elements including at least one different executable element than the selected elements.

The reselected elements may be combined for the plurality of tasks to create a revised executable process for the business process model at block 410.

In an example embodiment, instead of or prior to reselection during the operations at block 408 and block 410, the method 400 may attempt to resolve an issue raised during validation by attacking and resolving the problem directly. For example, an order of operations constraint may be applied.

Figure 5:
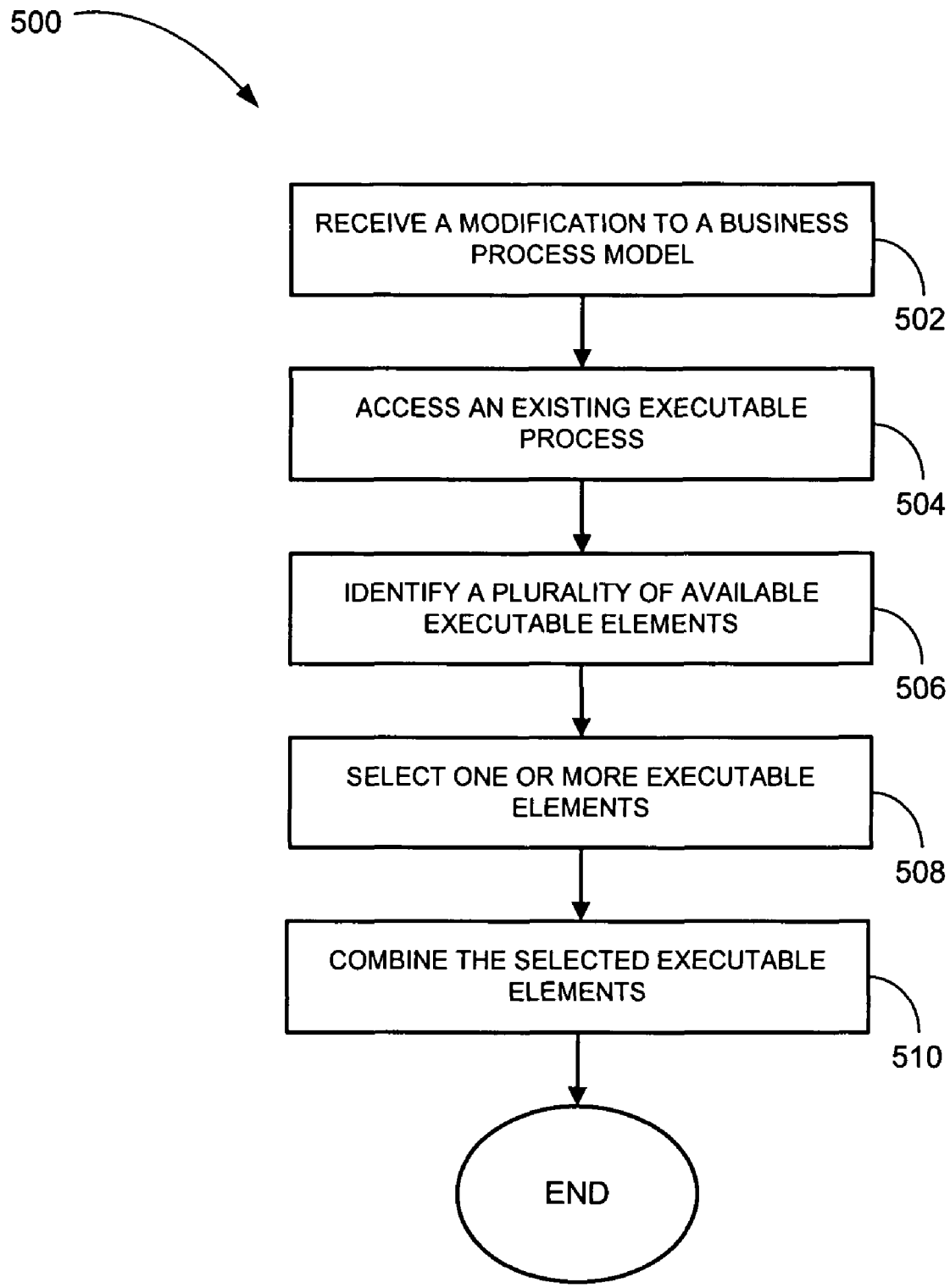
FIG. 5 is a flowchart illustrating a method for modifying an executable process of a business process model in accordance with an example embodiment.

FIG. 5 illustrates a method 500 for modifying an executable process of a business process model according to an example embodiment. In an example embodiment, the executable process created during the operations of the method 100 (see FIG. 1) may be modified in accordance with the method 500. For example, the executable process may be modified when a task is added, removed or changed from the plurality of tasks of the business process model.

A modification to a business process model may be received at block 502. The business process model may be defined by a plurality of tasks. The modification may include a change to the plurality of tasks. For example, the modification may include at least one different task than the plurality tasks of tasks and/or a change to the order of the plurality of tasks.

An existing executable process may be accessed for a business process model at block 504. The existing executable process may be defined by previously combined executable elements. Executable elements corresponding to unchanged parts of the business process model may also be identified at block 504.

A plurality of available executable elements capable of implementing the change (e.g., one or more tasks that are affected by the changes to the business process model) may be identified at block 506. For example, each of the plurality of available executable elements may be capable of providing functionality to implement a single task, a plurality of tasks, or a portion of one or more tasks of the plurality of tasks of the business process model.

One or more executable elements may be selected from among the plurality of available executable elements for the change at block 508. The selection may be based on functionality of an available executable element.

In an example embodiment, the method 200 (see FIG. 2) may be performed for the selection associated with the at least one different task. For example, a plurality of executable elements may be selected from among the plurality of available executable elements for one or more tasks of the at least one different task, the plurality of executable elements may be composed for the one or more tasks, consistency of the composed plurality of executable elements may optionally be checked according to a consistency check, and the composed plurality of executable elements may be selected for the one or more tasks (e.g., when the composed plurality of executable element passes the consistency check).

The selected elements may be combined for the change (e.g., at least one different task and at least one of the previously combined executable elements) to create a revised executable process for the business process model at block 510.

In an example embodiment, the combined executable elements of the modified executable process may be checked for consistency in accordance with the method 300 (see FIG. 3) and may be validated in accordance with the method 400 (see FIG. 4), which may be performed after completion of the operations at block 510.

Figure 6:
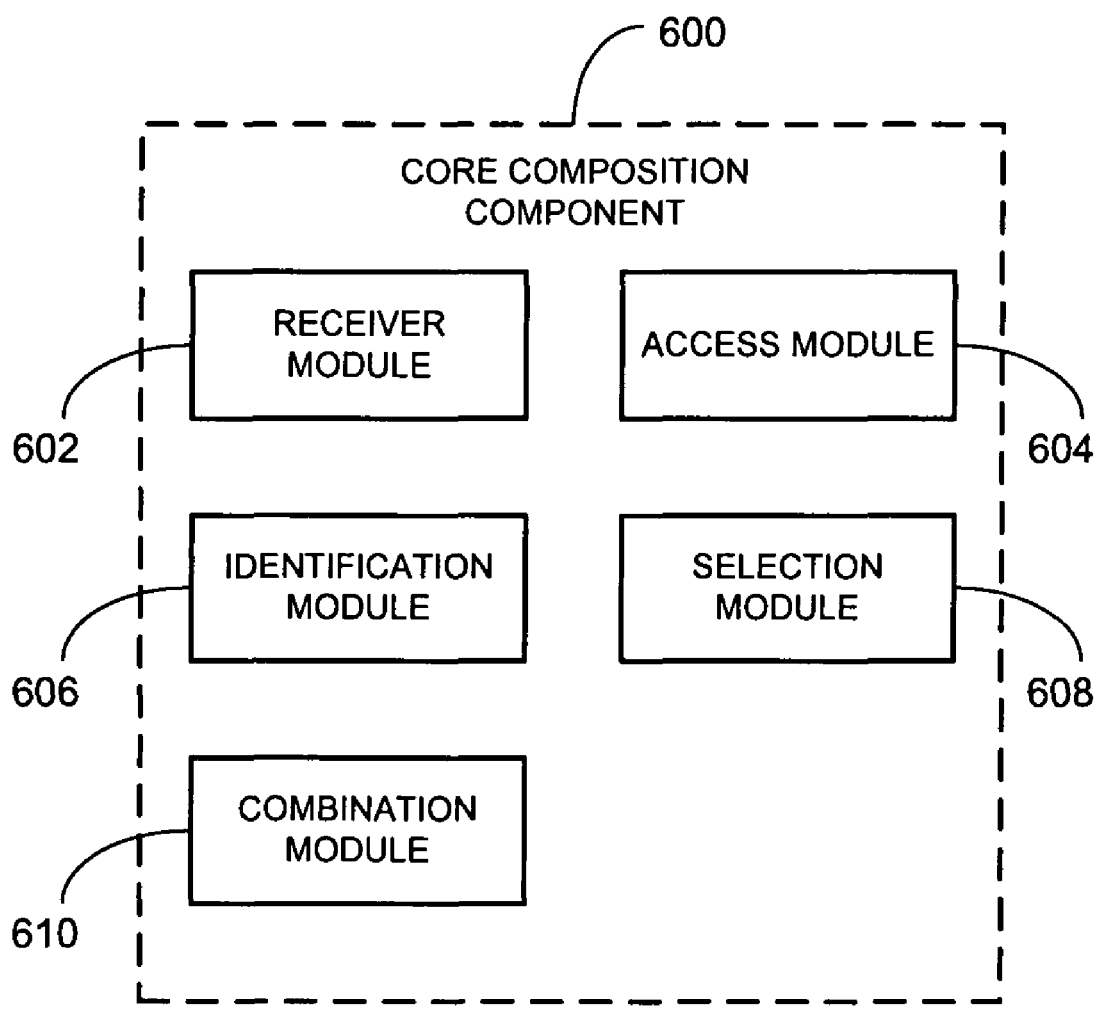
FIG. 6 is a block diagram of an example composition application.

FIG. 6 illustrates an example core composition component 600 for implementing the method 100 and/or the method 500 (see FIGS. 1 and 5). The core composition component may be deployed in a system as hardware and/or software to provide process composition and/or modification of an executable process.

The core composition component 600 may include a receiver module 602, an access module 604, an identification module 606, a selection module 608, and/or a combination module 610.

The optional receiver module 602 receives a modification to a business process model of a process modeling environment. As described in greater detail above, the business process model may be defined by a plurality of tasks and the modification may include at least one different task than a task of the plurality of tasks.

The access module 604 accesses a new business process model defined by a plurality of tasks from a process modeling environment and/or an existing executable process from an executable element repository for an existing business process model. The existing executable process may be defined by previously combined executable elements.

The identification module 606 identifies (e.g., through use of a discovery component) a plurality of available executable elements in an executable element repository capable of implementing the plurality of tasks of the new business process model or at least one different task for the plurality of tasks of the existing business process model.

The selection module 608 selects one or more executable elements among the plurality of available executable elements from the executable element repository for each of the plurality of tasks for the new business process model and/or for the at least one different task for the existing business process model. The selection may be based on functionality of an available executable element.

The combination module 610 combines the selected elements from the executable element repository for the plurality of tasks for the new business process model to create an executable process and/or for the at least one different task and at least one of the previously combined executable elements for the existing business process model to create a revised executable process for the business process model.

Figure 7:
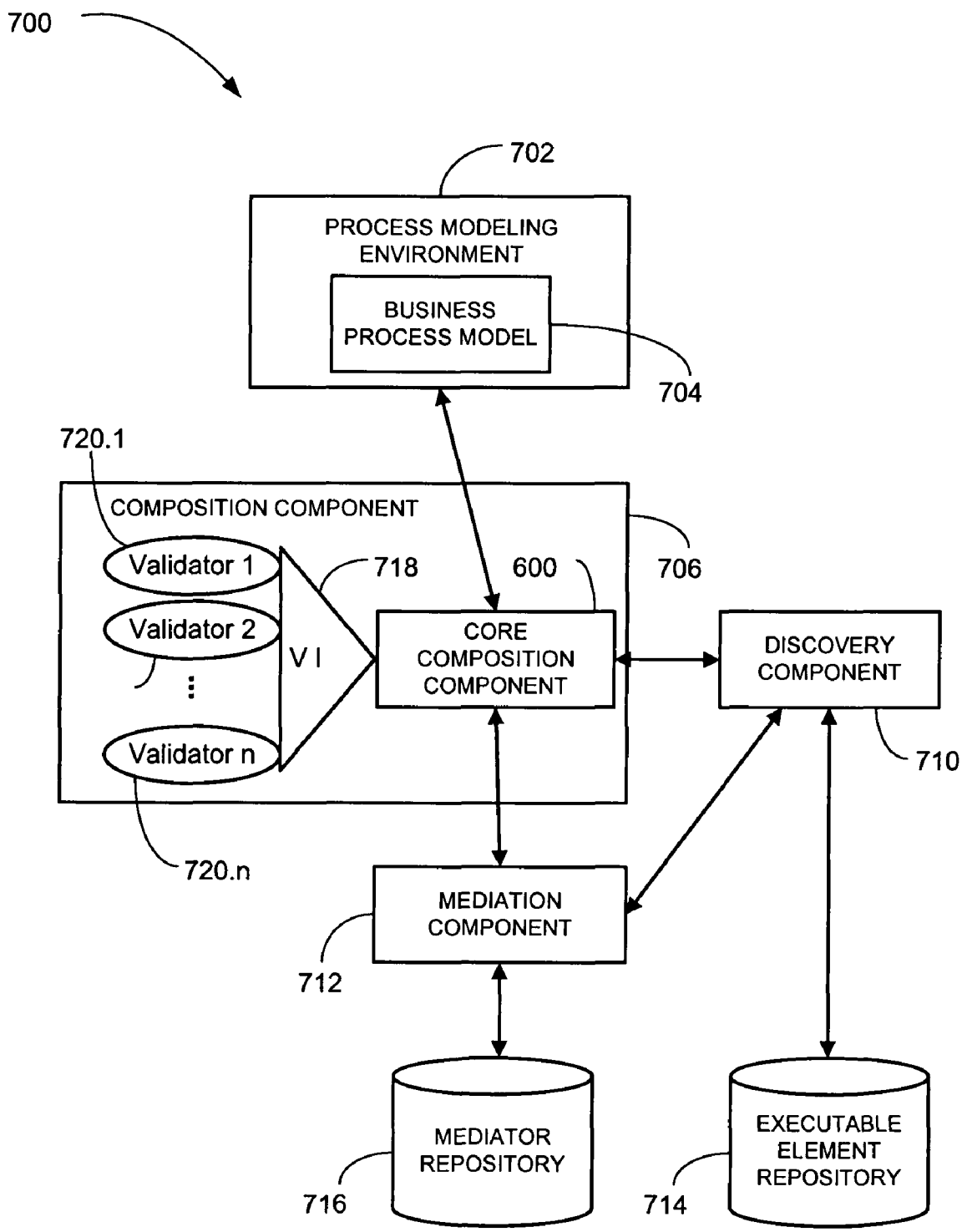
FIG. 7 is a block diagram of a modeling system in which modeling composition may be performed in accordance with an example embodiment.

FIG. 7 illustrates an example modeling system 700 in which the methods 100-500 and the core composition component 600 (see FIGS. 1-6) may be implemented.

The modeling system may include a process modeling environment 702 which may be used to design a business process model 704 and may serve as a graphical user interface (GUI) to a user. During the modeling phase and/or after finishing the design of the business process model 704, the user may request composition of an executable process for the business process model 704. The request may trigger interaction between the process modeling environment 702 and a composition component 706.

The business process model 704 may be provided to a composition component 706 for implementation of the business process model 704 as an executable process through composition.

The modeling system 700 may further include an executable element repository 714 (e.g., SAP Enterprise Services Repository) that is associated with a plurality of executable elements. The plurality of executable elements may optionally include a semantic description of functional properties and/or non-functional properties (e.g., how they may be accessed) for use by a discovery component 710.

Elements in the repository may be reusable for a variety of executable processes.

The discovery component 710 serves as an interface to the executable element repository 714 and may make simple and/or complex requests for executable elements. For example, the request may be that the executable elements include certain functionality and/or non-functional properties.

The composition component 706 interacts with the process modeling environment 702 and the discovery component 710 to provide the composition of executable elements. The composition component 706 includes the core composition component 600 (see FIG. 6).

The composition component 706 may further include a validator interface 718 and one or more validators 720.1-720.*n*. The validator interface 718 may provide an interface for the core composition component 600 to communicate with the validators 720.1-720.*n*. The use of the validator interface 718 and the validators 720.1-720.*n* may provide the modeling system 700 with flexibility for plugging in a variety of validators 720.1-720.*n* with respect to the current context of the business process model, however other configurations of validators may also be used. If you refer to the core composition component then that's fine, but it is more likely that the user of the system doesn't get to interact with this interface.

The core composition component 600 may communicate with a mediator repository 716 to map messaging formats between the components 708, 710 from one format to another. For example, the mediator repository 716 may be used to bridge a gap between a semantic description associated with an executable element and an XML message, such as by acting as an adaptor for different service descriptions.

Figure 8:
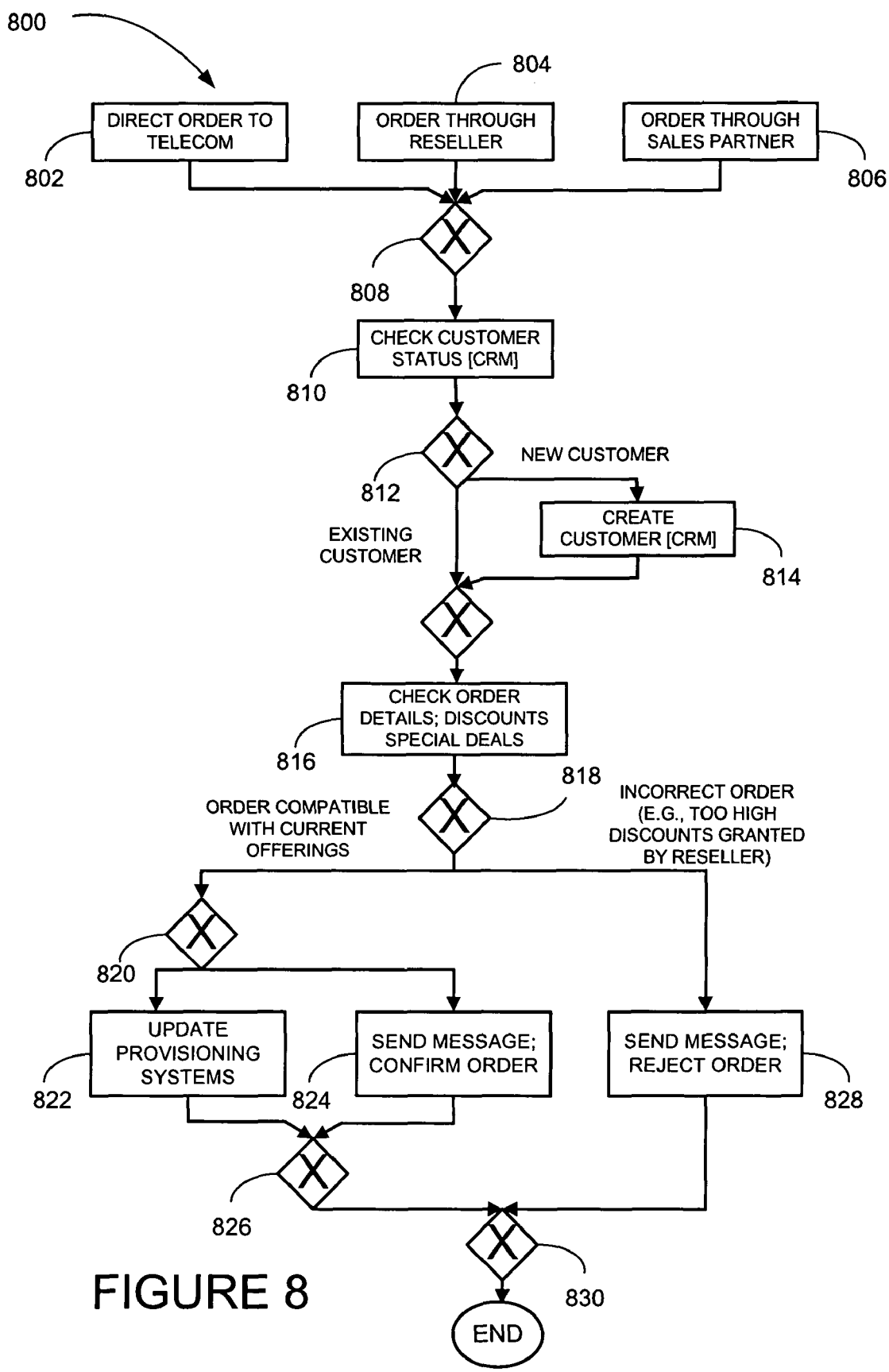
FIG. 8 is a block diagram of an example business process model.

FIG. 8 illustrates an example business process model 800. The business process model 800 is an example of a type of business process model for which an executable process may be composed in accordance with the method 100 (see FIG. 1) or of which the executable elements associated with may be further refined in accordance with the method 500 (see FIG. 5). However, other types of business process models may also be used.

As illustrated, the business process model 800 is for an ordering process that has overall goals including a successful new order, potentially a new customer in the CRM system, and/or service provisioning to the new customer. The business process model 800 may be seen as a refinement of the goal towards an implementation, which orders the various tasks and shows other tasks, such as credit checks, consistency checks in the purchase order, or the distinction between existing and new customers. The business process model as shown is in a BPMN-like notation, however other notations may also be used.

A process engineer may change an existing business process model 800 for processing customer service orders in the TeleCom domain (e.g., a customer orders a new internet connection), as illustrated in FIG. 8. The business process as shown includes three main parts: adding a customer to the CRM system (see block 814), given it is a new customer; checking the offer for correct pricing, discounts, and the like (see block 816); responding to the customer request (see block 824 and block 828) and, in case of positive outcome of the check, triggering the provisioning of the requested services (see block 822).

By way of an example, a process engineer may provide a modification to a middle portion to the business process model 800 (see block 502 of FIG. 5). The plurality of tasks of the business process model 800 may then be accessed. For example, the plurality of tasks starting with the task "check order details" for the business process model 800 in pseudo-BPEL notation may be as follows:

```
<sequence>
    (task: "check order details")
    <if>
        <condition>check-OK</condition>
        <flow>
            (existing BPEL: Update provisioning systems)
            (task: send message "Confirm order")
        </flow>
        <else>
            (task: send message "Reject order")
        </else>
    </if>
</sequence>
```

The changes to the plurality of tasks may then be identified (see block 504). For example, the changes to the plurality of tasks may include:
(task: "check order details")
(task: send message "Confirm order")
(task: send message "Reject order")
from above, in the given order. For the two latter tasks, a single executable element may be found (see block 506), since sending messages can come down to Web service invocations.

In this example, a single executable element may not be identified for the "check order details" task. Multiple executable elements may then be sought to perform the "check order details" task (see method 200). The goal of the task "check order details" as illustrated is to check whether the granted discounts are (1) corresponding to the discount the given customer can get and (2) the special deal that might be the basis of this order is applicable (timing of the special deal, amount of discount, consistent with the ordered products) and (3) that the combination of (1) and (2) is compliant with current policies. If there are executable elements for each of the subgoals (1), (2), and (3), a solution that calls the executable elements for (1) and (2) in parallel and (3) subsequently to both of their execution may be created (see the method 200). In pseudo-BPEL, that solution may look as follows:

```
<sequence>
    <flow>
        <invoke service for subgoal (1)/>
        <invoke service for subgoal (2)/>
    </flow>
    <invoke service for subgoal (3)
        -> result: check-OK or check-Fail/>
</sequence>
```

Executable element for subgoal (3) may be invoked after the executable elements for subgoals for (1) and (2), as is that the outcome of (1) and (2) may need to be present before (3) can be achieved.

Consistency of the composed plurality of executable elements for subgoals (1), (2) and (3) may be checked to ensure that orders with a total volume of more than 1000$ have manual approval by a key account manager (see 208). The consistency is not otherwise represented in the previous BPEL representation. The executable elements may then be selected to achieve the "check order details" task.

The selected executable elements may be combined (see block 510) such that the first listed part of the BPEL process may be as follows:

```
<sequence>
    <sequence>
        <flow>
            <invoke service for subgoal (1)/>
            <invoke service for subgoal (2)/>
        </flow>
        <invoke service for subgoal (3)
            -> result: check-OK or check-Fail/>
        <if>
            <condition>"check-OK AND volume > 1000$"
            </condition>
            <invoke "Manual order approval"
                -> result: check-OK or check-Fail/>
        </if>
    </sequence>
    <if>
        <condition>check-OK</condition>
        <flow>
            (existing BPEL: Update provisioning systems)
            <invoke/reply "Confirm order"/>
        </flow>
        <else>
            <invoke/reply "Reject order"/>
        </else>
    </if>
</sequence>
```

Figure 9:
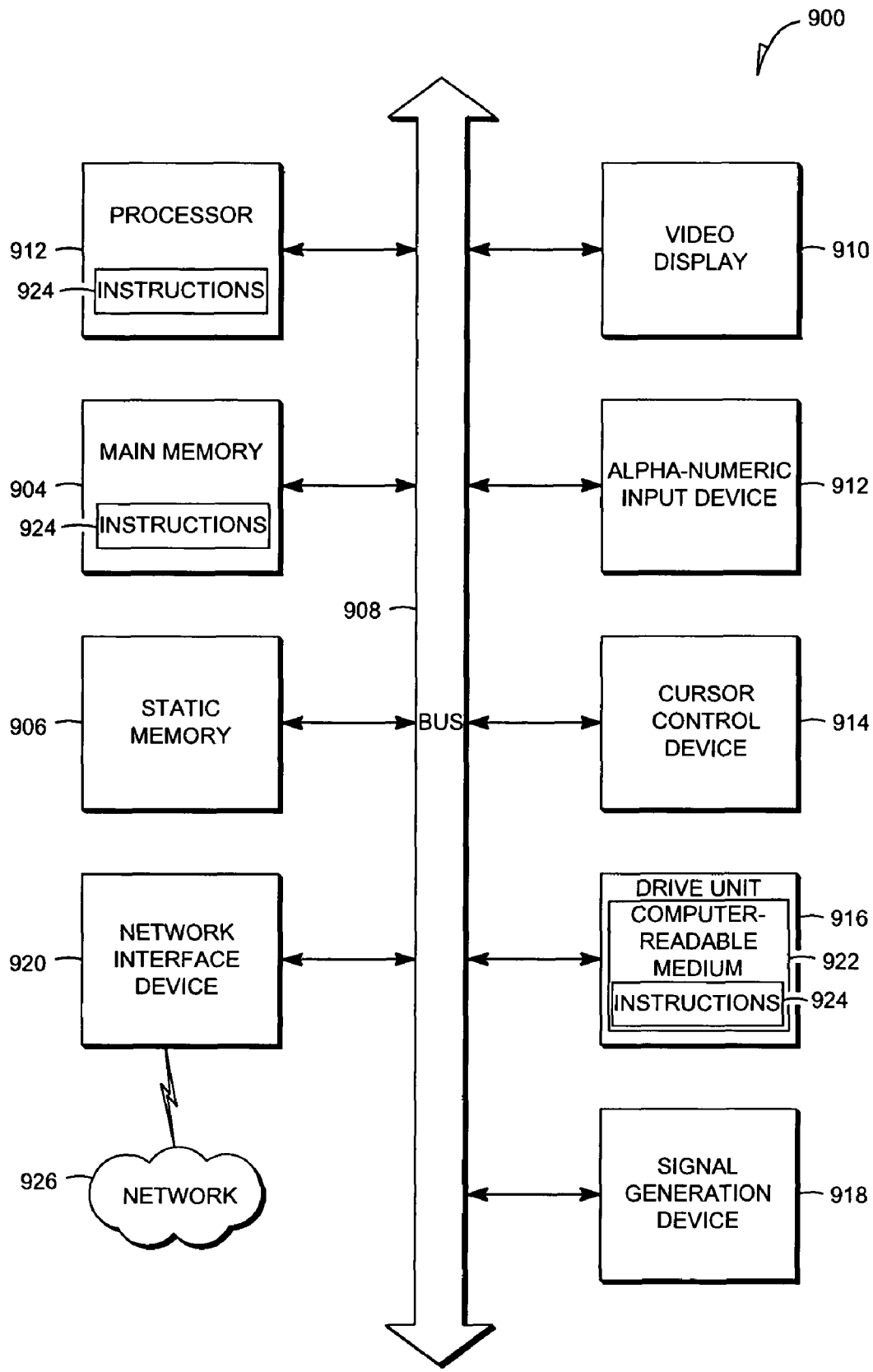
FIG. 9 illustrates a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 912 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 912 during execution thereof by the computer system 900, the main memory 904 and the processor 912 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method performed by one or more processors, the method comprising:
    accessing a business process model defined by a plurality of tasks;
    identifying a plurality of available executable elements capable of implementing the plurality of tasks, each of the plurality of available executable elements capable of providing functionality to implement a part of the business process model and annotated with a semantic description describing functionality, and at least one non-functional property, of each respective available executable element;
    selecting one or more executable elements among the plurality of available executable elements for each of the plurality of tasks, the selection based on functionality of an available executable elements and compatibility among the selected executable elements based on the at least one non-functional property of each of the selected executable elements, the selection further comprising:
        determining an order of operations for the selected executable elements based on the functionality of each the selected executable elements;
        composing the selected executable elements according to the order of operations for each of the plurality of tasks;
        ranking the composed selected executable elements based on the non-functional property of each respective selected executable element;
        selecting the composed executable elements based on the ranking;
        checking consistency of the composed selected executable elements for each of the plurality of tasks; and
        combining the selected executable elements for the plurality of tasks to create an executable process for the business process model.

2. The method of claim 1, wherein the at least one non-functional property is selected from a group of properties consisting of a price associated with running an available executable element, a non-currency cost associated with running the available executable element, a duration that the available executable element is to run, security associated with running the available executable element, and a quality of service associated with running the available executable element.

3. The method of claim 1, wherein composing the plurality of executable elements further comprises:
checking consistency of the composed plurality of executable elements according to a consistency check.

4. The method of claim 3, wherein selecting the composed plurality of executable elements for the task comprises:
selecting the composed plurality of executable elements for the one or more tasks when the composed plurality of executable elements passes the consistency check.

5. The method of claim 1, further comprising:
applying an order of operations constraint among the selected executable elements in response to feedback received from the consistency check, the order of operations constraint including that at least a first executable element of the plurality of executable elements that is to be executed before a second executable element.

6. The method of claim 1, further comprising:
reselecting one or more executable elements among the plurality of available executable elements for at least one task of the plurality of tasks in response to the consistency check, the reselected elements including at least one different executable element than the selected executable elements; and
combining the reselected executable elements for the plurality of tasks to create a revised executable process for the business process model.

7. The method of claim 1, further comprising:
validating the combination of selected executable elements for the plurality of tasks for compliance with at least one policy.

8. The method of claim 7, further comprising:
applying an order of operations constraint among the selected executable elements in response to feedback received from validating, the order of operations constraint including that at least a first executable element of the plurality of executable elements be executed before a second executable element.

9. The method of claim 7, further comprising:
reselecting one or more executable elements among the plurality of available executable elements for at least one task of the plurality of tasks in response to feedback received from validating, the reselection based on functionality of the available executable element and the feedback received from the validating, the reselected elements including at least one different executable element than the selected executable elements; and
combining the reselected executable elements for the plurality of tasks to create a revised executable process for the business process model.

10. The method of claim 1, further comprising:
providing the executable process to a validator; and
receiving an evaluation of the combination of selected executable elements for the plurality of tasks for compliance with at least one policy from the validator.

11. The method of claim 1, wherein each of the plurality of tasks is associated with at least one resource that is capable of performing the task.

12. The method of claim 1, wherein each of the plurality of available executable elements is capable of providing a service.

13. A method performed by one or more processors, the method comprising:
receiving a modification to a business process model, the business process model defined by a plurality of tasks, the modification including at least one change to the plurality of tasks;
accessing an existing executable process for the business process model, the existing executable process defined by previously combined executable elements;
identifying a plurality of available executable elements capable of implementing the change, each of the plurality of available executable elements capable of providing functionality to implement a part of the business process model and annotated with a semantic description describing functionality, and at least one non-functional property, of each respective available executable element;
selecting one or more executable elements among the plurality of available executable elements for the change, the selection based on functionality of an available executable element and compatibility among the selected executable elements based on the at least one non-functional property of each of the one or more selected executable elements, the selection comprising:
determining an order of operations for the selected executable elements based on the functionality of each the selected executable elements;
composing the selected executable elements according to the order of operations for each of the plurality of tasks;
ranking the composed selected executable elements based on the non-functional property of each respective selected executable element;
selecting the composed executable elements based on the ranking;
checking consistency of the composed selected executable elements for each of the plurality of tasks; and
combining the selected executable elements for the change and at least one of the previously combined executable elements to create a revised executable process for the business process model.

14. The method of claim 13, wherein the change is at least one different task.

15. The method of claim 13, wherein composing the plurality of executable elements further comprises:
checking consistency of the composed plurality of executable elements according to a consistency check.

16. The method of claim 15, wherein selecting the composed plurality of executable elements for the at least one different task comprises:
selecting the composed plurality of executable elements for the at least one different task when the composed plurality of executable element passes the consistency check.

17. The method of claim 13, further comprising:
checking consistency of the selected executable elements for the plurality of tasks.

18. The method of claim 17, further comprising:
applying an order of operations constraint among the selected executable elements in response to feedback received from the consistency check, the order of operations constraint including that at least a first executable element of the plurality of executable elements be executed before a second executable element.

19. The method of claim 17, further comprising:
reselecting one or more executable elements among the plurality of available executable elements for each of the plurality of tasks in response to feedback received from the consistency check, the reselection based on functionality of the available executable element and the feedback received from the consistency check, the reselected executable elements including at least one different executable element than the selected executable elements; and combining the reselected executable elements for the plurality of tasks to create a revised executable process for the business process model.

20. The method of claim 13, further comprising:

validating the combination of selected executable elements for the plurality of tasks for compliance with at least one policy.

21. An apparatus including one or more processors, the apparatus comprising:

an access module to access a business process model defined by a plurality of tasks from a process modeling environment;

an identification module to identify a plurality of available executable elements in an executable element repository capable of implementing the plurality of tasks, each of the plurality of available executable elements capable of providing functionality to implement a part of the business process model and annotated with a semantic description describing functionality, and at least one non-functional property, of each respective available executable element;

a selection module to select one or more executable elements among the plurality of available executable elements from the executable element repository for each of the plurality of tasks, the selection based on functionality of an available executable element and compatibility among the selected executable elements based on the at least one non-functional property of each of the selected executable elements, the selection further comprising:

determining an order of operations for the selected one or more executable elements based on the functionality of each the selected one or more executable elements;

composing the selected one or more executable elements according to the order of operations for each of the plurality of tasks;

ranking the composed of the selected one or more executable elements based on the non-functional property of each the selected one or more executable elements;

selecting the composed of the selected one or more executable elements based on the ranking;

checking consistency of the composed of the selected one or more executable elements for each of the plurality of tasks; and a combination module to combine the selected executable elements from the executable element repository for the plurality of tasks to create an executable process for the business process model.

22. The apparatus of claim 21, wherein the business process model is expressed in a notation selected from a group of notations consisting of Business Process Modeling Notation (BPMN), Event-driven Process Chains (EPC), and Uniform Modeling Language (UML) Activity Diagrams.

23. An apparatus including one or more processors, the apparatus comprising:

a receiver module to receive a modification to a business process model of a process modeling environment, the business process model defined by a plurality of tasks, the modification including at least one different task than a tasks of the plurality of tasks;

an access module to access an existing executable process from an executable element repository for a business process model, the existing executable process defined by previously combined executable elements;

an identification module to identify a plurality of available executable elements from the executable element repository capable of implementing the at least one different task, each of the plurality of available executable elements capable of providing functionality to implement a part of the business process model and annotated with a semantic description describing functionality, and at least one non-functional property, of each respective available executable element;

a selection module to select one or more executable elements among the plurality of available executable elements for the at least one different task, the selection based on functionality of an available executable element and compatibility among the one or more selected executable elements based on the at least one non-functional property of each of the one or more selected executable elements, the selection comprising:

determining an order of operations for the selected executable elements based on the functionality of each the selected executable elements;

composing the selected executable elements according to the order of operations for each of the plurality of tasks;

ranking the composed selected executable elements based on the non-functional property of each respective selected executable element;

selecting the composed executable elements based on the ranking;

checking consistency of the composed selected executable elements for each of the plurality of tasks; and a combination module to combine the selected executable elements for the at least one different task and at least one of the previously combined executable elements to create a revised executable process for the business process model.

24. The apparatus of claim 23, wherein the executable process is in Business Process Execution Language (BPEL).

25. A non-transitory machine-readable medium comprising instructions, which when executed by a machine, cause the machine to:

access a business process model defined by a plurality of tasks;

identify a plurality of available executable elements capable of implementing the plurality of tasks, each of the plurality of available executable elements capable of providing functionality to implement one or more parts of the business process model and annotated with a semantic description describing functionality, and at least one non-functional property, of each respective available executable element;

select one or more executable elements among the plurality of available executable elements for each of the plurality of tasks, the selection based on functionality of an available executable element and compatibility among the selected executable elements based on the at least one non-functional property of each of the one or more selected executable elements, the selection further comprising:

determining an order of operations for the selected executable elements based on the functionality of each the selected executable elements;

composing the selected executable elements according to the order of operations for each of the plurality of tasks;

ranking the composed selected executable elements based on the non-functional property of each respective selected executable element;

selecting the composed executable elements based on the ranking;

checking consistency of the composed selected executable elements for each of the plurality of tasks; and combine the selected elements for the plurality of tasks to create an executable process for the business process model.

26. A non-transitory machine-readable medium comprising instructions, which when executed by a machine, cause the machine to:

receive a modification to a business process model, the business process model defined by a plurality of tasks, the modification including at least one different task than the tasks of the plurality of tasks;

access an existing executable process for a business process model, the existing executable process defined by previously combined executable elements;

identify a plurality of available executable elements capable of implementing the at least one different task, each of the plurality of available executable elements capable of providing functionality to implement the business process model and annotated with a semantic description describing functionality, and at least one non-functional property, of each respective available executable element;

select one or more executable elements among the plurality of available executable elements for the at least one different task, the selection based on functionality of an available executable element and compatibility among the selected executable elements based on the at least one non-functional property of each of the one or more selected executable elements, the selection comprising:

determining an order of operations for the selected executable elements based on the functionality of each the selected executable elements;

composing the selected executable elements according to the order of operations for each of the plurality of tasks;

ranking the composed selected executable elements based on the non-functional property of each respective selected executable element;

selecting the composed executable elements based on the ranking;

checking consistency of the composed selected executable elements for each of the plurality of tasks; and combine the selected elements for the at least one different task and at least one of the previously combined executable elements to create a revised executable process for the business process model.

27. The machine-readable medium of claim 26, further comprising instructions that causes the machine to:

reselect one or more executable elements among the plurality of available executable elements for each of the plurality of tasks in response to feedback received from the consistency check, the reselection based on functionality of the available executable element and the feedback received from the consistency check, the reselected elements including at least one different executable element than the selected elements; and combine the reselected elements for the plurality of tasks to create a revised executable process for the business process model.

28. The machine-readable medium of claim 26, further comprising instructions that causes the machine to:

validate the combination of selected elements for the plurality of tasks for compliance with at least one policy.

* * * * *